US011858279B2

(12) United States Patent
Ikagawa et al.

(10) Patent No.: US 11,858,279 B2
(45) Date of Patent: Jan. 2, 2024

(54) RECORDING DEVICE

(71) Applicant: Seiko Epson Corporation, Tokyo (JP)

(72) Inventors: Takamasa Ikagawa, Matsumoto (JP); Koji Hara, Matsumoto (JP); Hiroyuki Maeda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/549,277

(22) Filed: Dec. 13, 2021

(65) Prior Publication Data

US 2022/0184983 A1 Jun. 16, 2022

(30) Foreign Application Priority Data

Dec. 16, 2020 (JP) ................................ 2020-208178

(51) Int. Cl.
*B41J 29/17* (2006.01)
*B41J 11/00* (2006.01)

(52) U.S. Cl.
CPC ............ *B41J 29/17* (2013.01); *B41J 11/007* (2013.01)

(58) Field of Classification Search
CPC . B41J 29/17; B41J 11/007; B41J 13/08; B41J 15/048
See application file for complete search history.

(56) References Cited

U.S. PATENT DOCUMENTS

| | | | | |
|---|---|---|---|---|
| 2005/0168515 A1* | 8/2005 | Nagai | B41J 11/0065 347/23 |
| 2007/0230992 A1* | 10/2007 | Takayanagi | G03G 15/161 399/101 |
| 2016/0306311 A1* | 10/2016 | Ono | F16H 25/14 |
| 2017/0113476 A1* | 4/2017 | Hara | B41J 29/17 |
| 2018/0236785 A1* | 8/2018 | Sadakuni | B41J 15/048 |
| 2019/0179246 A1* | 6/2019 | Kaneko | G03G 15/0266 |

FOREIGN PATENT DOCUMENTS

| | | | |
|---|---|---|---|
| EP | 2481696 A2 * | 8/2012 | B41J 11/007 |
| JP | 2004-161454 | 6/2004 | |
| JP | 2014-160135 | 9/2014 | |

* cited by examiner

*Primary Examiner* — Scott A Richmond
(74) *Attorney, Agent, or Firm* — WORKMAN NYDEGGER

(57) ABSTRACT

A recording device includes a recording unit configured to perform recording by discharging a droplet to a medium a conveyance belt disposed facing the recording unit and convey the medium, and a cleaning unit including a scrape unit configured to make contact with the conveyance belt and scrape off a residual at the conveyance belt. The cleaning unit includes a pressing part configured to push the scrape unit against the conveyance belt, and the scrape unit includes a sponge member configured to be pressed against the conveyance belt to scrape off the residual and a contact part of the sponge member that is brought into contact with the conveyance belt is worn.

11 Claims, 7 Drawing Sheets

RECORDING DEVICE

The present application is based on, and claims priority from JP Application Serial Number 2020-208178, filed Dec. 16, 2020, the disclosure of which is hereby incorporated by reference herein in its entirety.

BACKGROUND

1. Technical Field

The present disclosure relates to a recording device.

2. Related Art

In the related art, as disclosed in JP-A-2004-161454, a recording device including a conveyance belt that conveys a medium, a recording unit that performs recording by discharging a droplet to the medium being conveyed, and a cleaning blade that removes a residual adhered to the conveyance belt by making contact with the conveyance belt is known.

However, in the above-mentioned recording device, the surface of the conveyance belt may be damaged and the lifetime of the conveyance belt may be reduced when the residual adhered to the end portion of the cleaning blade solidifies and the solidified residual makes contact with conveyance belt.

SUMMARY

A recording device includes a recording unit configured to perform recording by discharging a droplet to a medium a conveyance belt disposed facing the recording unit and configured to rotate to convey the medium, and a cleaning unit including a scrape unit configured to make contact with the conveyance belt and scrape off a residual at the conveyance belt. The cleaning unit includes a pressing part configured to push the scrape unit against the conveyance belt, and the scrape unit includes a sponge member configured to be pressed against the conveyance belt to scrape off the residual and a contact part of the sponge member that is brought into contact with the conveyance belt is worn.

DESCRIPTION OF EXEMPLARY EMBODIMENTS

1. First Embodiment

First, a configuration of a recording device 1 is described. The recording device 1 of this example is, for example, an ink-jet printer.

In each drawing, the direction along the X axis is the depth direction of the recording device 1, the direction along the Y axis is the width direction of the recording device 1, and the direction along the Z axis is the height direction of the recording device 1. In this embodiment, the −X direction side of the recording device 1 is the device front side, and the +X direction side is the device back side.

Figure 1:
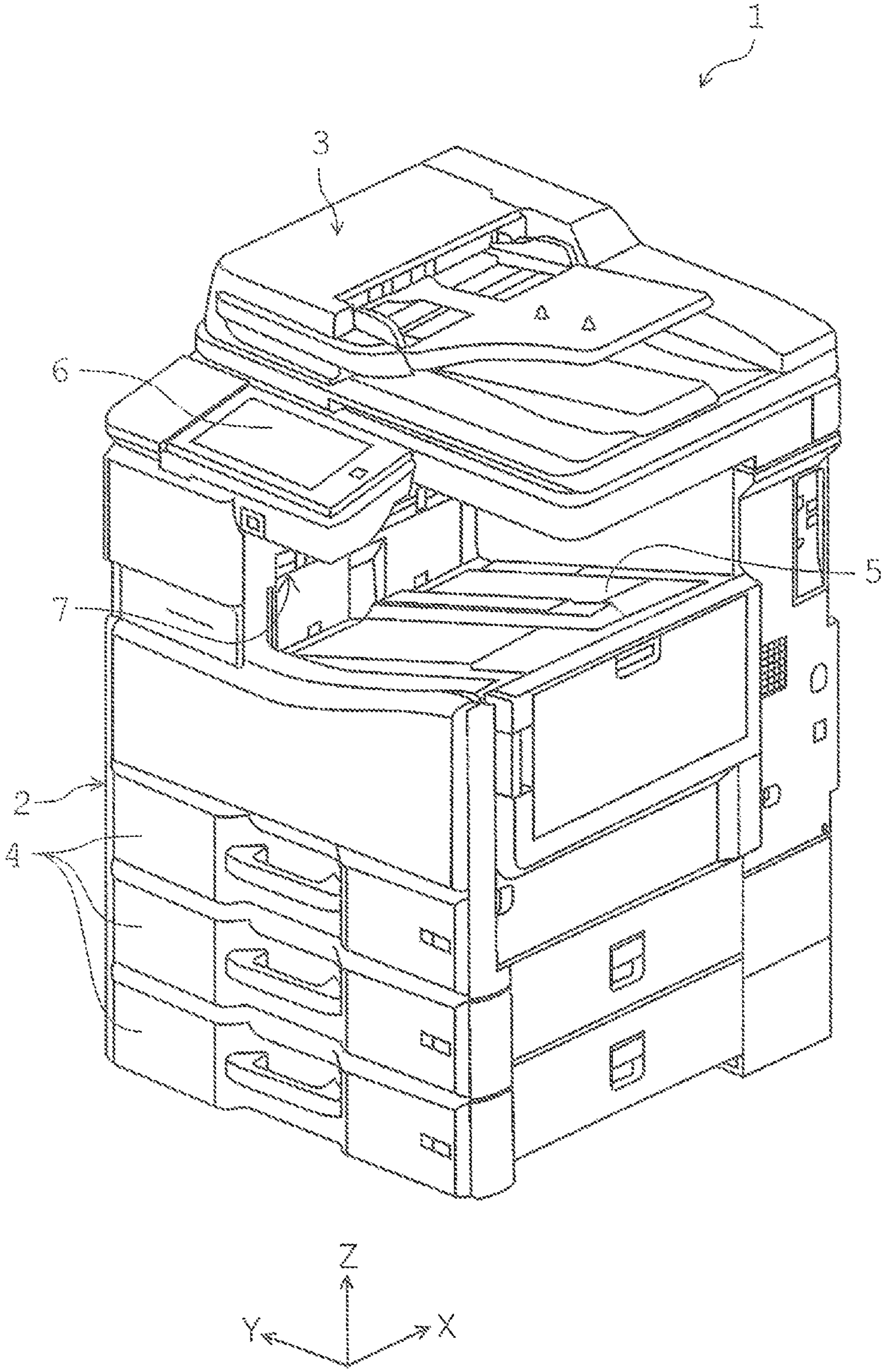
FIG. 1 is a perspective view illustrating a configuration of a recording device according to a first embodiment.

As illustrated in FIG. 1, the recording device 1 of this embodiment is configured as a multifunctional device including a device main body 2 and a scanner unit 3. The device main body 2 includes a plurality of medium housing cassettes 4 that house a medium P. Each medium housing cassette 4 is detachably attached from the device front side of the device main body 2. The medium P is, for example, a sheet such as plain paper, thick paper, and a photograph sheet.

In the device height direction in the device main body 2, a sheet ejection unit 7 that ejects the medium P on which recording has been performed by a line head 9 (FIG. 2) serving as a recording unit that performs recording by discharging ink, which is an example of liquid, and a medium placing part 5 where the medium P ejected from the sheet ejection unit 7 is placed are provided between the scanner unit 3 and the medium housing cassette 4. In addition, an operation unit 6 is provided on the device front side of the device main body 2. The operation unit 6 is provided with a display member such as a liquid crystal panel. Instructions of a recording operation and an image reading operation can be input to the recording device 1 by operating the operation unit 6.

Next, a conveyance path 11 of the medium P in the recording device 1 is described.

Figure 2:
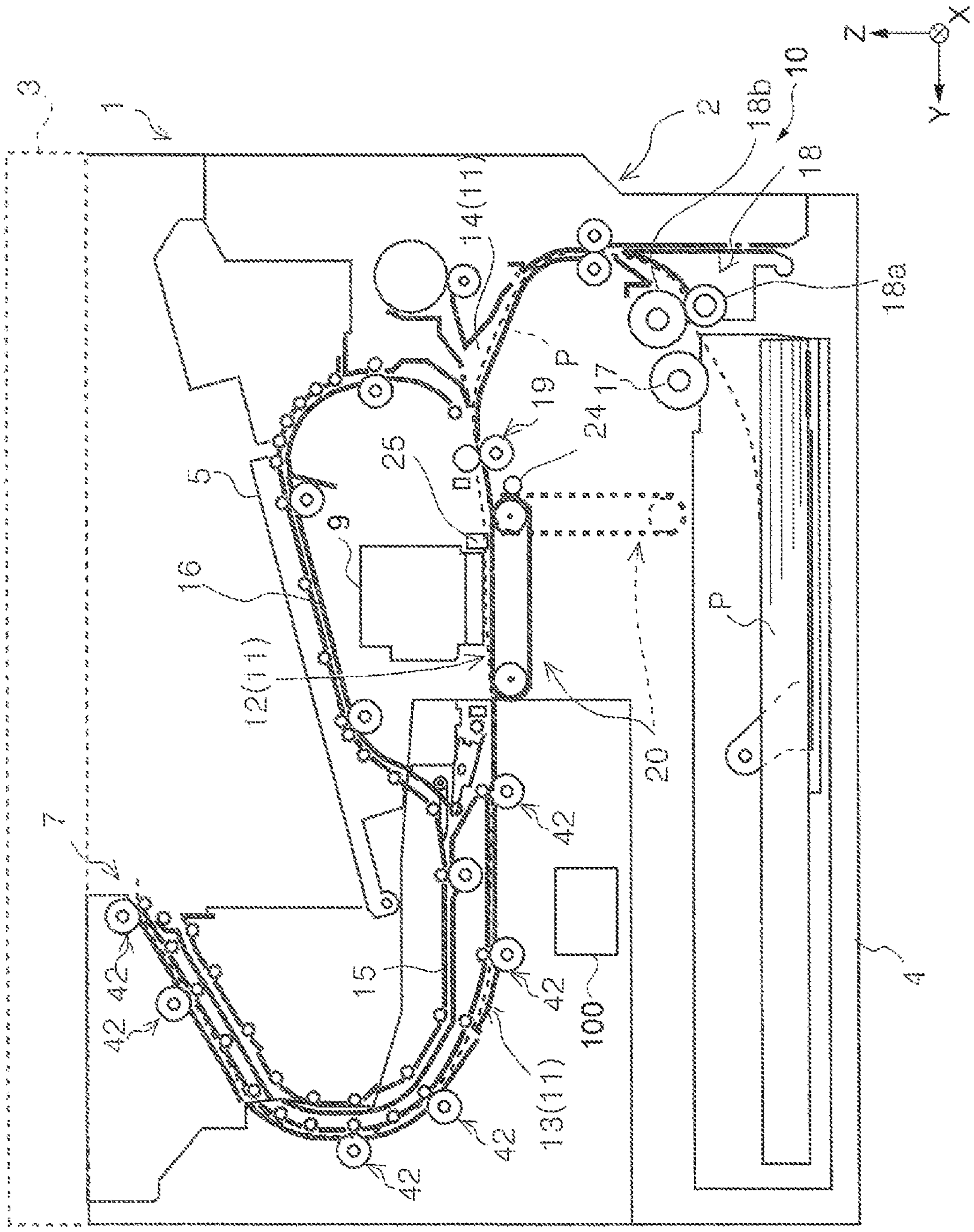
FIG. 2 is a schematic view illustrating an internal configuration of the recording device according to the first embodiment.

As illustrated in FIG. 2, the recording device 1 includes the conveyance path 11 of the medium P. The conveyance path 11 includes a feed path 14 that sends the medium P picked up from the medium housing cassette 4, a straight path 12 coupled to the feed path 14 and including a recording region A of the line head 9 (see FIG. 3A), and a face-down ejection path 13 that sends the medium P from the straight path 12 to the sheet ejection unit 7. The medium P is conveyed along the conveyance path 11 by a medium conveyance unit 10 (a feed roller 17, a separation roller pair 18, a registration roller 19, a belt conveyance unit 20, and a conveyance roller pair 42).

Conveyance of the medium P from the medium housing cassette 4 to the sheet ejection unit 7 is described below. Note that the recording device 1 includes a switchback path 15 branched off from the straight path 12 on the downstream side of the line head 9, and an inversion path 16 coupled to the switchback path 15. The inversion path 16 inverts the first surface (front surface) and the second surface (rear surface) of the medium P and then returns the medium P to the straight path 12. The recording device 1 is configured to enable so-called double-sided recording in which after recording on the first surface of the medium P is performed, recording is performed on the second surface. The description of the inversion of the medium P at the switchback path 15 and the inversion path 16 is omitted.

At the feed path 14, the feed roller 17 and the separation roller pair 18 that separates a plurality of mediums P into single sheet are provided in this order along the conveyance direction of the medium P. The feed roller 17 is configured to be driven into rotation by a driving source not illustrated in the drawing. In addition, the separation roller pair 18 is also called retard roller, and includes a driving roller 18*a* that sends the medium P toward the straight path 12, and a driven roller 18*b* that separates the medium P by nipping the medium P together with the driving roller 18*a*.

Of the plurality of mediums P housed in the medium housing cassette 4, the topmost medium P is picked up by the feed roller 17 and conveyed downstream in the conveyance direction. At this time, the next and subsequent media P may also be conveyed together with the topmost medium P in some situation, but the topmost medium P and the next and subsequent media P are separated by the separation roller pair 18 such that only the topmost medium P is sent to the feed path 14.

The registration roller 19 is provided downstream of the separation roller pair 18 in the conveyance direction. The feed path 14 and the straight path 12 are coupled at the position of the registration roller 19. The straight path 12 is configured as a linearly extending path, and the registration roller 19, the belt conveyance unit 20, a static eliminator unit 25, and the line head 9 are provided at the straight path 12. The straight path 12 is a path extending through the recording region A of the line head 9 (FIG. 3A) to the upstream side and downstream side of the line head 9.

In this embodiment, the belt conveyance unit 20 is disposed in a region facing the head surface of the line head 9, and supports the side opposite to the recording surface of the medium P.

When the medium P is conveyed at a position facing the line head 9 on the belt conveyance unit 20, the line head 9, disposed facing the conveyance belt 21, performs recording by discharging ink as droplets to the recording surface of the medium P. The line head 9 is a recording head in which the nozzle that discharges ink is provided to cover the entire width of the medium P, and is capable of performing recording over the entire width direction of the medium P with no movement in the width direction of the medium P.

Note that while the recording device 1 of this embodiment includes the line head 9, it is also possible to adopt a serial recording head mounted in a carriage and configured to perform recording by discharging liquid to the medium P while moving back and forth in a direction intersecting the medium conveyance direction.

The medium P conveyed through the straight path 12 is then sent to the face-down ejection path 13. The face-down ejection path 13 is the conveyance path 11 with a curvature coupled to the straight path 12, and sends the medium P recorded by the line head 9 such that the medium P is ejected from the sheet ejection unit 7 with the recording surface side down.

The medium P having entered the face-down ejection path 13 is conveyed by a plurality of the conveyance roller pairs 42, ejected from the sheet ejection unit 7, and placed on the medium placing part 5 with the recording surface side down.

Figure 3A:
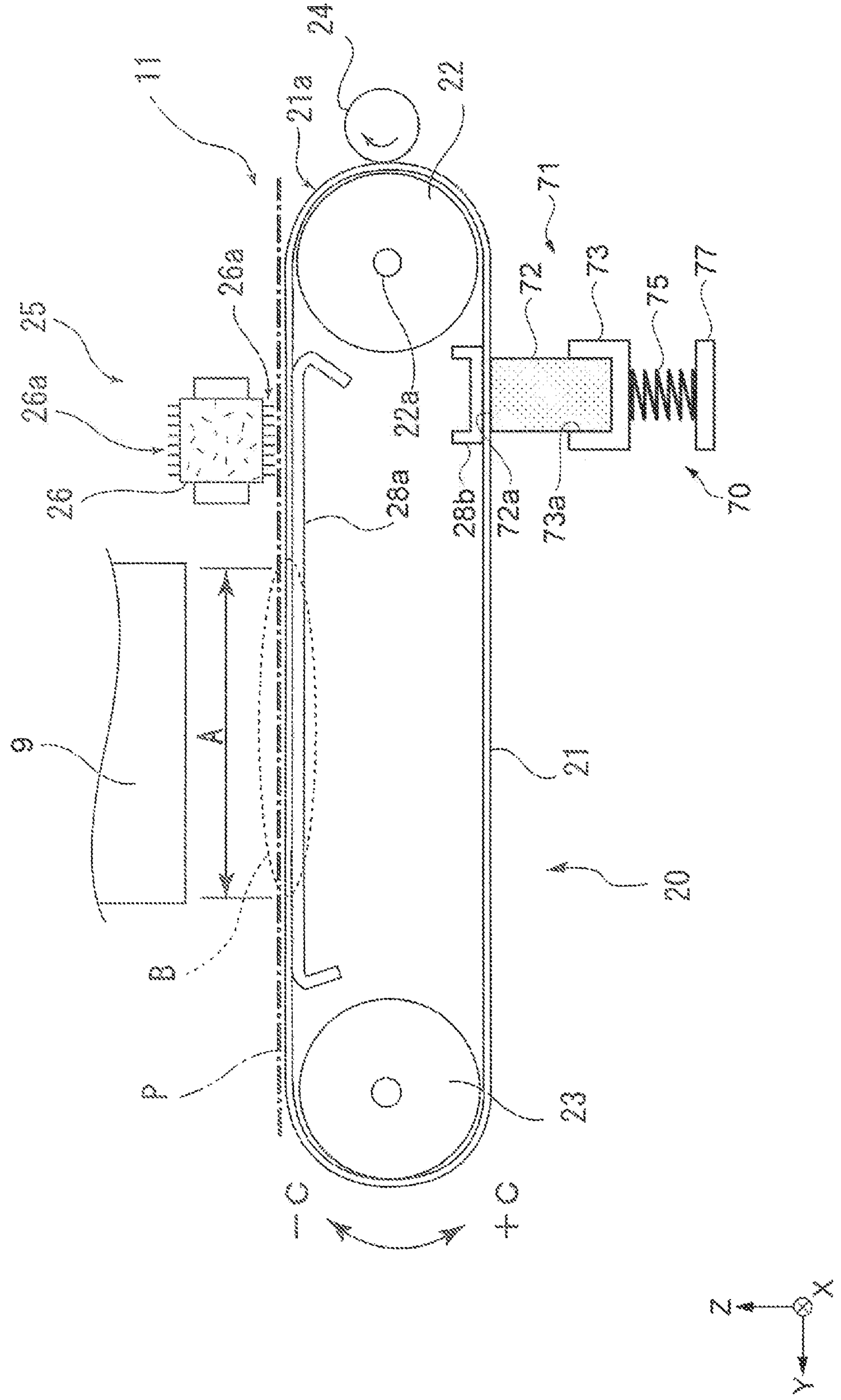
FIG. 3A is a schematic view illustrating a configuration of a belt conveyance unit and a cleaning unit according to the first embodiment.

As illustrated in FIG. 3A, the belt conveyance unit 20 according to this embodiment includes an endless conveyance belt 21 that suctions the medium P to a belt outer surface 21*a*, an upstream driving roller 22 that is at least two rollers around which the conveyance belt 21 is provided, and a downstream driven roller 23 located downstream of the upstream driving roller 22 in the medium conveyance direction (the +Y-axis direction in FIG. 3A). The conveyance belt 21 is disposed facing the head surface of the line head 9.

The belt conveyance unit 20 conveys the medium P downstream in the medium conveyance direction when the upstream driving roller 22 is driven into rotation by a driving source such as a motor and the conveyance belt 21 is driven. At this time, the downstream driven roller 23 is driven and rotated by the conveyance belt 21 that is driven by the rotational driving of the upstream driving roller 22. The upstream driving roller 22 is driven into rotation around a drive shaft 22*a*.

The driving source of the belt conveyance unit 20 is configured to enable forward and reverse rotation so as to circumferentially move the conveyance belt 21 in the forward direction, which is the conveyance direction in which the medium P is conveyed (the +C direction of the two-headed arrow illustrated in FIG. 3A), and in the reverse direction (the −C direction of the two-headed arrow illustrated in FIG. 3A), which is the opposite direction.

The belt conveyance unit 20 is configured to be switchable, by a state switching unit not illustrated in the drawing, between a first state where at least a part of the belt outer surface 21*a* is located at a recording position B (facing position) of the line head 9, and a second state where the belt outer surface 21*a* is farther from the line head 9 than the recording position B (the dashed line in FIG. 2). The first state is a state where the recording on the medium P is performed by the line head 9. On the other hand, the second state is a state where the recording on the medium P by the line head 9 is not performed. At this time, to maintain the recording performance of the line head 9, the line head 9 in the non-recording state is covered from the −Z direction side with a cap not illustrated in the drawing, for example.

The recording device 1 includes a cleaning unit 70 that cleans the conveyance belt 21. The cleaning unit 70 includes a scrape unit 71 that scrapes residuals (such as paper dust and ink) adhered to the belt outer surface 21*a* of the conveyance belt 21. In this manner, the residuals are removed from the belt outer surface 21*a*. Note that the specific configuration of the cleaning unit 70 is described later. The scrape unit 71 is provided upstream of a charging roller 24 in the movement direction of the conveyance belt 21.

In this embodiment, the conveyance belt 21 is a belt that conveys the medium P by electrostatically attracting it on the belt outer surface 21*a*, and the belt conveyance unit 20 includes the charging roller 24 as an example of a charging unit that charges the conveyance belt 21, and the static eliminator unit 25 that eliminates the electric charge of the surface of the medium P conveyed by the conveyance belt 21.

The charging roller 24 is provided upstream of the static eliminator unit 25 in the movement direction of the conveyance belt 21, at a position facing the upstream driving roller 22 below the conveyance path 11, and the charging roller 24 makes contact with the belt outer surface 21*a*.

When the upstream driving roller 22 and the downstream driven roller 23 are rotated and the conveyance belt 21 is driven, the charged belt outer surface 21*a* after the contact with the charging roller 24 becomes a path formation surface that forms the conveyance path 11. Thus, suctioning of the medium P at the conveyance belt 21 that forms the conveyance path 11 can be increased, and the medium P can be more effectively suctioned to the conveyance belt 21.

The static eliminator unit 25 includes an endless static eliminator belt 26 that is provided over the width direction (the direction along the X axis) of the medium P and rotates in the width direction. The static eliminator belt 26 is provided with a brush 26*a* protruding on the outside, and a portion facing the medium P on the conveyance belt 21 moves in the direction along the X axis, which is the medium width direction. The brush 26*a* of the static eliminator belt 26 is pressed against the medium P, and thus the electric charge is removed from the surface of the medium P. The suctioning of the medium P to the conveyance belt 21 can be improved by eliminating the electric charge of the surface of the medium P.

In addition, the belt conveyance unit 20 includes a first backup plate 28*a* and a second backup plate 28*b* that support the conveyance belt 21 from the inner surface side between the upstream driving roller 22 and the downstream driven roller 23. The first backup plate 28*a* is disposed facing the static eliminator unit 25 with the conveyance belt 21 therebetween, and the second backup plate 28*b* is disposed facing the cleaning unit 70 (the scrape unit 71) with the conveyance belt 21 therebetween.

The recording device 1 includes the control unit 100 that controls various operations executed at the recording device 1. The control unit 100 includes a CPU, a memory, a control circuit, and an I/F (interface). The CPU is a computation processing device. The memory is a storage device that secures a region that stores the program of the CPU, a work area and the like, and includes a memory element such as a RAM and an EEPROM. When recording data or the like is acquired from an external device such as an information processing terminal through the I/F, the CPU transmits a control signal to each driving unit through the control circuit. In this manner, the medium conveyance unit 10, the line head 9, and the like are controlled.

Here, when a plate-shaped blade is used to scrape the residual (such as calcium carbonate included in paper dust) adhered to the belt outer surface 21*a* of the conveyance belt 21, for example, the residual is scraped out by the blade and the residual is removed from the conveyance belt 21. However, if the time passes in the state where the residual adhered to the end portion of the blade is accumulated, a part of the residual solidifies. Then, when the solidified residual makes contact with the belt outer surface 21*a* of the conveyance belt 21, the conveyance belt 21 is locally damaged. The conveyance belt 21 of this embodiment is a belt that conveys the medium P by electrostatically attracting the medium P, and therefore, if the belt outer surface 21*a* of the conveyance belt 21 is damaged by the solidified residual, the insulation layer and the adhesive layer formed on the belt outer surface 21*a* are damaged, the charging function is degraded, and conveyance failure of the medium P occurs. That is, the lifetime of the conveyance belt 21 is reduced.

Note that to suppress the solidification of the residual adhered to the plate-shaped blade, it is conceivable to adopt a configuration including a cleaning mechanism that removes the residual adhered to the end portion of the blade, a mechanism that performs contact and separation of the blade to and from the conveyance belt 21 and the like, but there are concerns that the structure will become more complex and the recording device 1 will become larger.

In view of this, the cleaning unit 70 of the recording device 1 of this embodiment is configured to suppress the occurrence of the above-mentioned failure. A configuration of the cleaning unit 70 of this embodiment is described below.

The cleaning unit 70 includes the scrape unit 71 that makes contact with the conveyance belt 21 and scrapes out the residual adhered to the belt outer surface 21*a* of the conveyance belt 21.

The scrape unit 71 includes a sponge member 72. The sponge member 72 has a block-like cuboid shape and extends in the direction along the X axis. In the first state, the sponge member 72 is disposed below the conveyance belt 21. The end portion of the sponge member 72 in the +Z direction includes a contact part 72*a* that makes contact with the belt outer surface 21*a*. The contact part 72*a* is composed of a flat surface, and makes surface contact with the conveyance belt 21.

The size of the sponge member 72 in the direction along the X axis is equal to the size of the conveyance belt 21 in the direction along the X axis. In this manner, the residual can be scraped out over the entire width direction of the belt outer surface 21*a* of the conveyance belt 21.

The cleaning unit 70 includes a supporting part 73 that supports the lower end portion of the sponge member 72, a pressing part 75 that pushes the supporting part 73 upward, and a fixing member 77 that supports the pressing part 75. The fixing member 77 is fixed at a certain distance from the second backup plate 28*b*. The pressing part 75 is, for example, a coil spring. One end of the pressing part 75 is coupled to the supporting part 73, and the other end is coupled to the fixing member 77. The sponge member 72 supported by the supporting part 73 is biased in the +Z direction by the pressing part 75, and is pressed against the conveyance belt 21 with a substantially constant pressure over the entire longitudinal direction of the sponge member 72. In this manner, the contact part 72*a* of the sponge member 72 scrapes off the residual adhered to the belt outer surface 21*a*. The sponge member 72 is brought into contact with the conveyance belt 21 at all times by the pressing part 75, and thus the cleaning performance can be improved.

In addition, in the first state, the supporting part 73 includes a recess 73*a* recessed downward, and the lower end portion of the sponge member 72 is fit to the recess 73*a*. In addition to the lower end surface of the sponge member 72, the surface of the sponge member 72 on the +Y direction side and the surface of the sponge member 72 on the −Y direction are supported by the supporting part 73. Thus, the sponge member 72 is not detached from the supporting part 73 even when the sponge member 72 makes contact with the conveyance belt 21 that is in circumferential movement, and the sponge member 72 can be brought into contact with the conveyance belt 21 in a stable state.

The sponge member 72 is a member whose contact part 72*a* is worn when making contact with the circumferentially moving conveyance belt 21. That is, the sponge member 72 is a member that scrapes off the residual on the conveyance belt 21 while the contact part 72*a* that makes contact with the conveyance belt 21 will be worn.

The sponge member 72 of this embodiment is a foaming melamine sponge made of melamine resin. Melamine sponge is composed of multiple fine mesh structures. Melamine sponge is favorable in scraping of residuals and wearing of the contact part 72*a* making contact with the conveyance belt 21. The size of the sponge member 72 can be appropriately set. It is set in accordance with the periodical replacement period of the conveyance belt 21, for example. In this manner, the maintenance frequency of the sponge member 72 can be reduced.

Figure 3B:
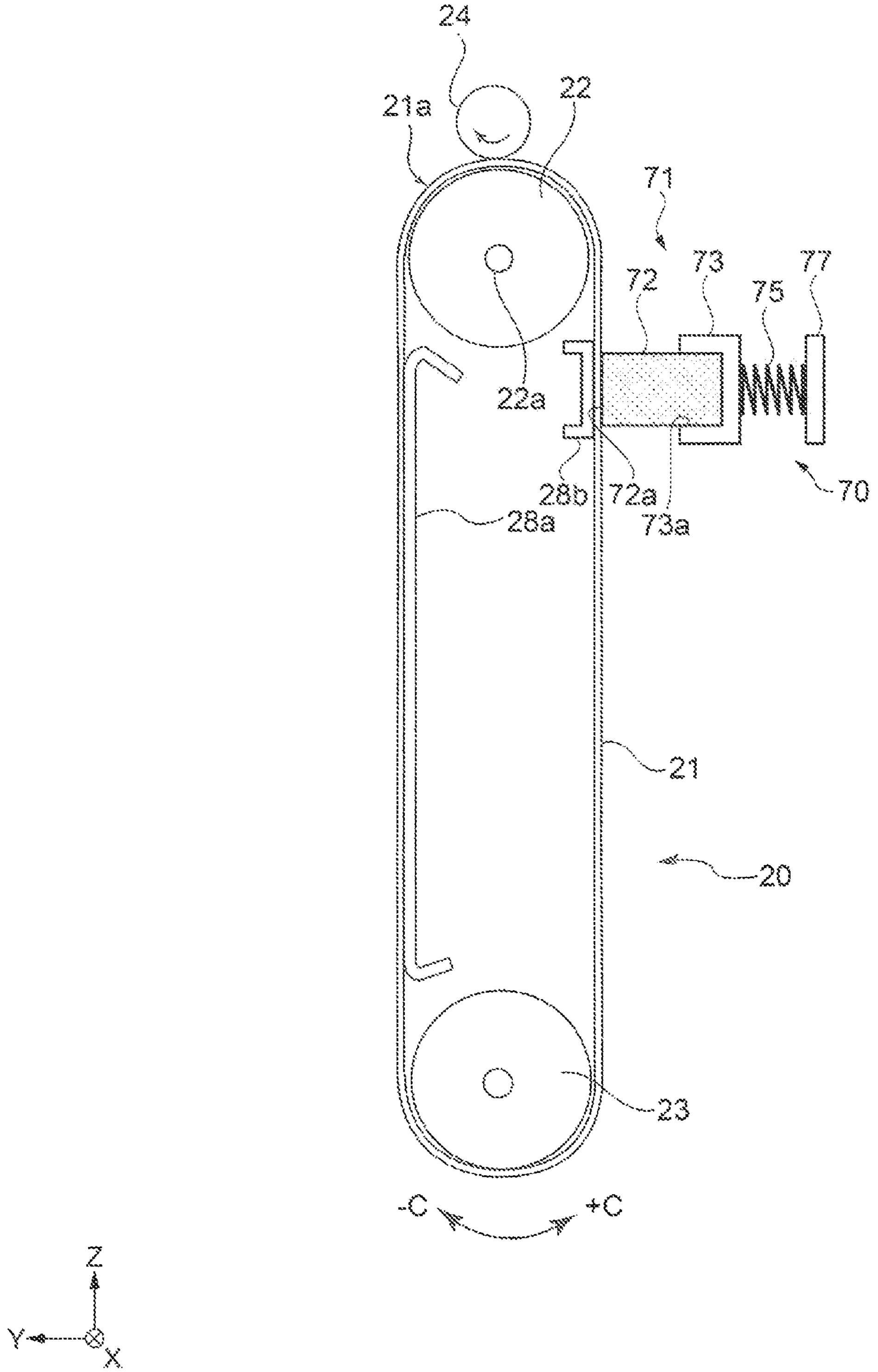
FIG. 3B is a schematic view illustrating a configuration of the belt conveyance unit and the cleaning unit according to the first embodiment.

In addition, the position of the cleaning unit 70 relative to the belt conveyance unit 20 is fixed, and the cleaning unit 70 moves along with the state switching of the belt conveyance unit 20. That is, as illustrated in FIG. 3B, when the conveyance belt 21 is switched from the first state to the second state, the cleaning unit 70 moves together with the conveyance belt 21. In this manner, the interference with the cleaning unit 70 can be prevented at the time of switching of the state of the conveyance belt 21.

In this manner, the interference with the cleaning unit 70 can be prevented at the time of switching of the state of the conveyance belt 21. In addition, since the sponge member 72 makes contact with the conveyance belt 21, the contact part 72*a* of the sponge member 72 is worn due to the friction with the conveyance belt 21. That is, the sponge member 72 scrapes off the residual adhered to the conveyance belt 21, while being worn and dropped from the scrape unit 71 together with the scraped residual.

In this manner, the residual scraped off from the conveyance belt 21 is not accumulated on the contact part 72*a* of the sponge member 72. That is, the residual adheres to the contact part 72*a* of the sponge member 72, and the residual does not solidify. Accordingly, for example, in comparison with a case where the residual on the conveyance belt 21 is removed with the blade, the damage of the conveyance belt due to the solidified residual is suppressed, and thus the lifetime of the conveyance belt 21 can be increased.

In addition, in comparison with a configuration including a cleaning mechanism that removes the residual adhered to the end portion of the blade and/or a mechanism that performs contact and separation of the blade to and from the conveyance belt 21 in the configuration of removing the residual on the conveyance belt 21 using the blade, the structure of the recording device 1 is simplified and the upsizing of the recording device 1 can be suppressed.

2. Second Embodiment

Next, a second embodiment is described. Note that the same configurations as those of the first embodiment are denoted with the same reference numerals, and the overlapping description is omitted.

Figure 4:
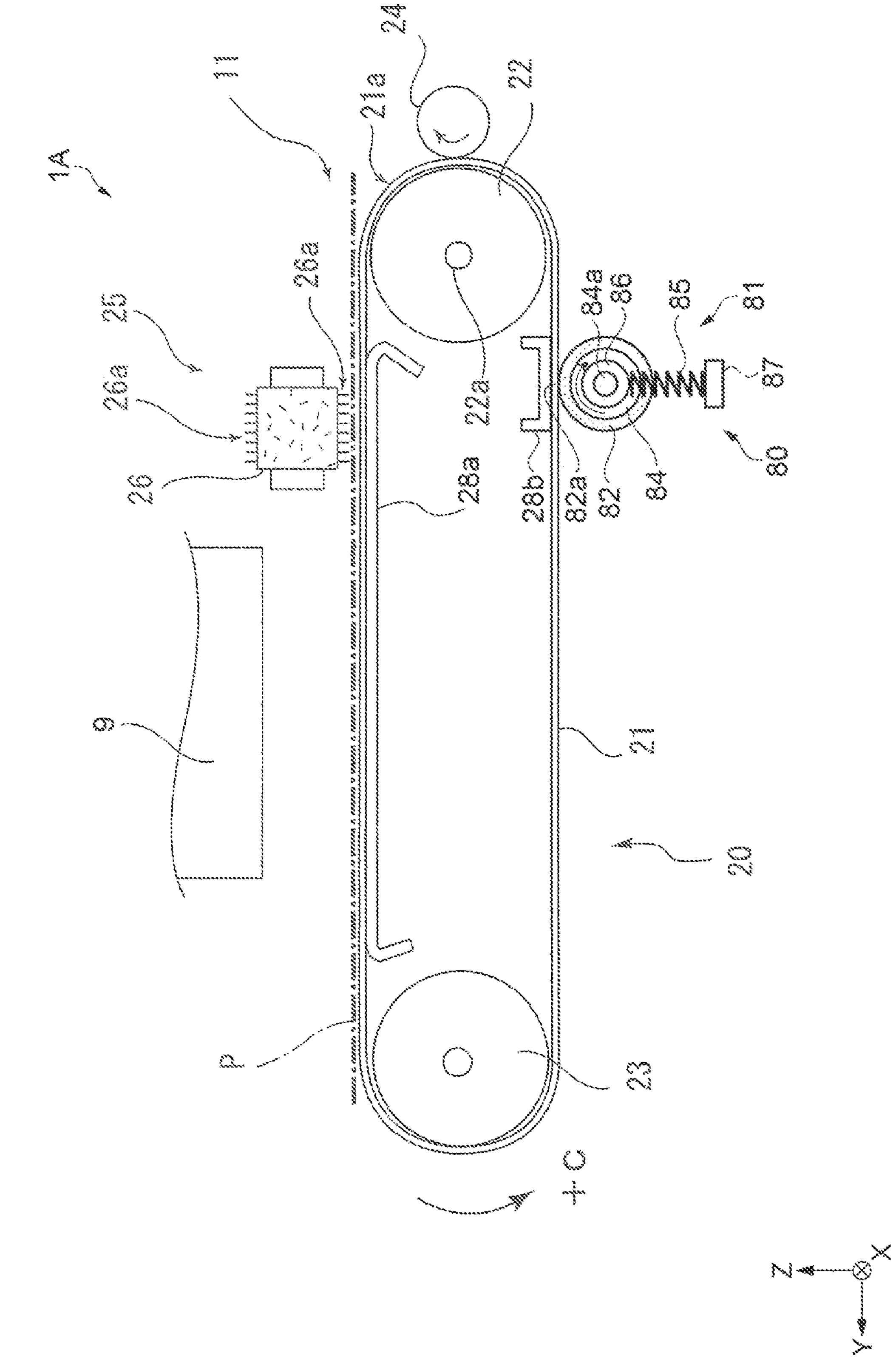
FIG. 4 is a schematic view illustrating a configuration of a recording device according to a second embodiment.

As illustrated in FIG. 4, a recording device 1A of this embodiment includes a cleaning unit 80. The cleaning unit 80 includes a scrape unit 81 that scrapes off the residual at the conveyance belt 21.

The scrape unit 81 includes a roller 84 with a rotation shaft 84*a*, and a sponge member 82 is disposed around the peripheral surface of the roller 84. The sponge member 82 is disposed at the peripheral surface of the roller 84, with equal thickness. The sponge member 82 and the roller 84 are fixed, and the sponge member 82 rotates along with the rotation of the roller 84. The sponge member 82 is a melamine sponge.

The cleaning unit 80 includes a pressing part 85 (such as a coil spring) and a fixing member 87 that supports the pressing part 85, and the roller 84 is pushed by the pressing part 85 toward the conveyance belt 21. The roller 84 is driven into rotation along with the circumferential movement of the conveyance belt 21. Thus, the entirety in the circumferential direction of the sponge member 82 disposed on the roller 84 can serve as a contact part 82*a*.

In this manner, the residual at the conveyance belt 21 can be scraped off while rotating the roller 84 along with the circumferential movement of the conveyance belt 21. In addition, since the sponge member 82 is equally worn by the rotation of the roller 84, the durability (lifetime) of the sponge member 82 can be improved in comparison with the configuration in which the sponge member 82 is brought into contact with the conveyance belt 21 in a fixed manner.

Further, in the recording device 1A of this embodiment, a speed difference is set between the circumferential speed of the conveyance belt 21 and the circumferential speed of the roller 84. In this manner, the speed difference between the conveyance belt 21 and the roller 84 can make it easier to scrape off the residual at the conveyance belt 21.

More specifically, a torque limiter 86 is coupled to the rotation shaft 84*a*. The torque limiter 86 exerts a load on the rotation of the rotation shaft 84*a*, and it is thus possible to easily generate a speed difference between the conveyance belt 21 and the roller 84.

As described above, according to this embodiment, when the conveyance belt 21 is circumferentially moved in the +C direction, the roller 84 is driven into rotation clockwise, and thus the conveyance belt 21 and the roller 84 rotate together. Then, when the torque limiter 86 acts on roller 84, a load is exerted on the rotation shaft 84*a*, and the circumferential speed of the roller 84 is reduced relative to the circumferential speed of the conveyance belt 21 (a speed difference is caused). In this manner, the friction between the conveyance belt 21 and the contact part 82*a* of the sponge member 82 increases, and thus the cleaning performance can be improved. In addition, since the sponge member 82 makes contact with the conveyance belt 21 while being rotated, the durability (lifetime) of the sponge member 82 can be improved. Note that the residual scraped by the sponge member 82 is ejected in the −Y direction from the contact part 82*a* with the rotation of the roller 84, and dropped from the scrape unit 81.

3. Third Embodiment

Next, a third embodiment is described. Note that the same configurations as those of the first embodiment are denoted with the same reference numerals, and the overlapping description is omitted.

Figure 5A:
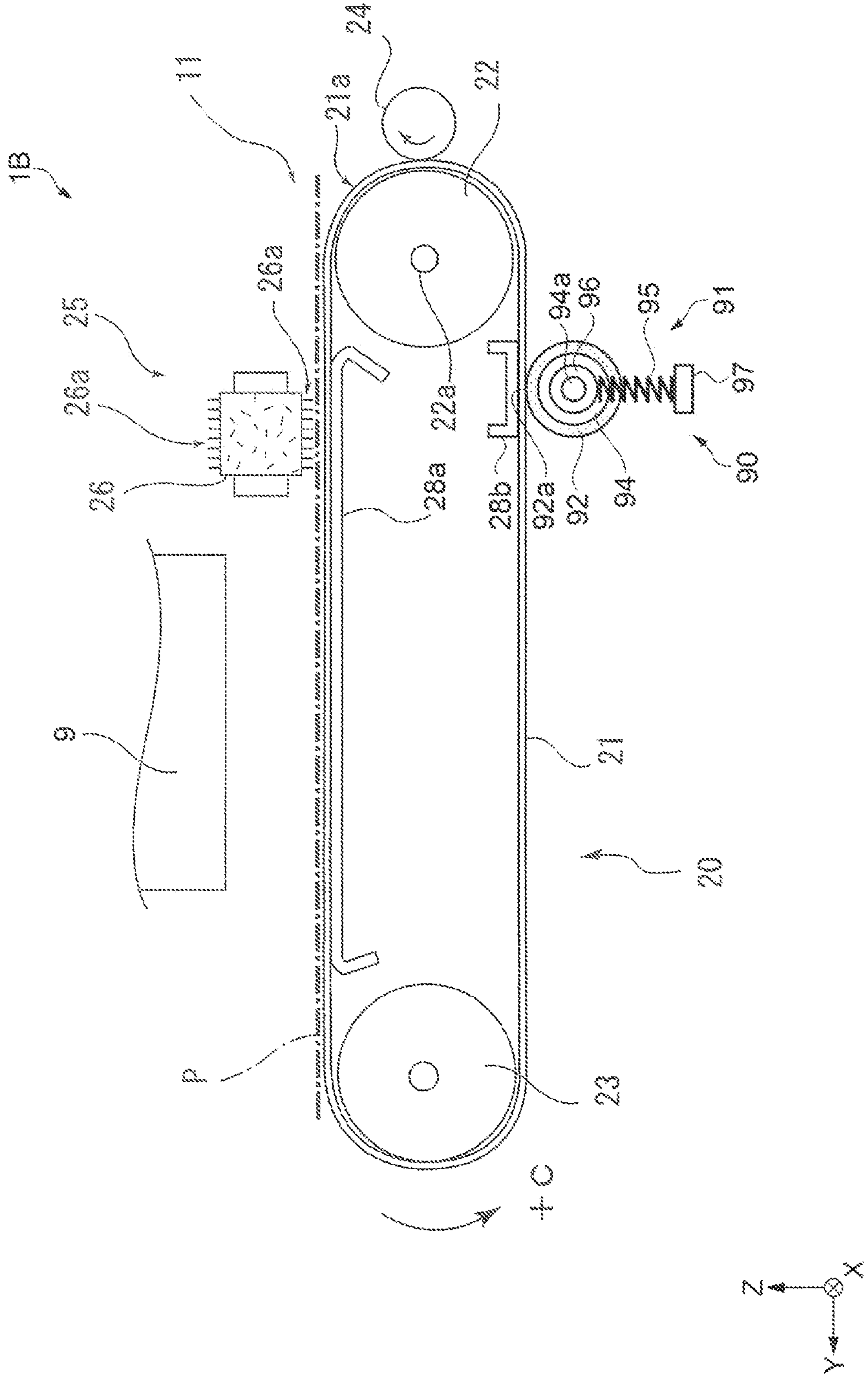
FIG. 5A is a schematic view illustrating a configuration of a recording device according to a third embodiment.
Figure 5B:
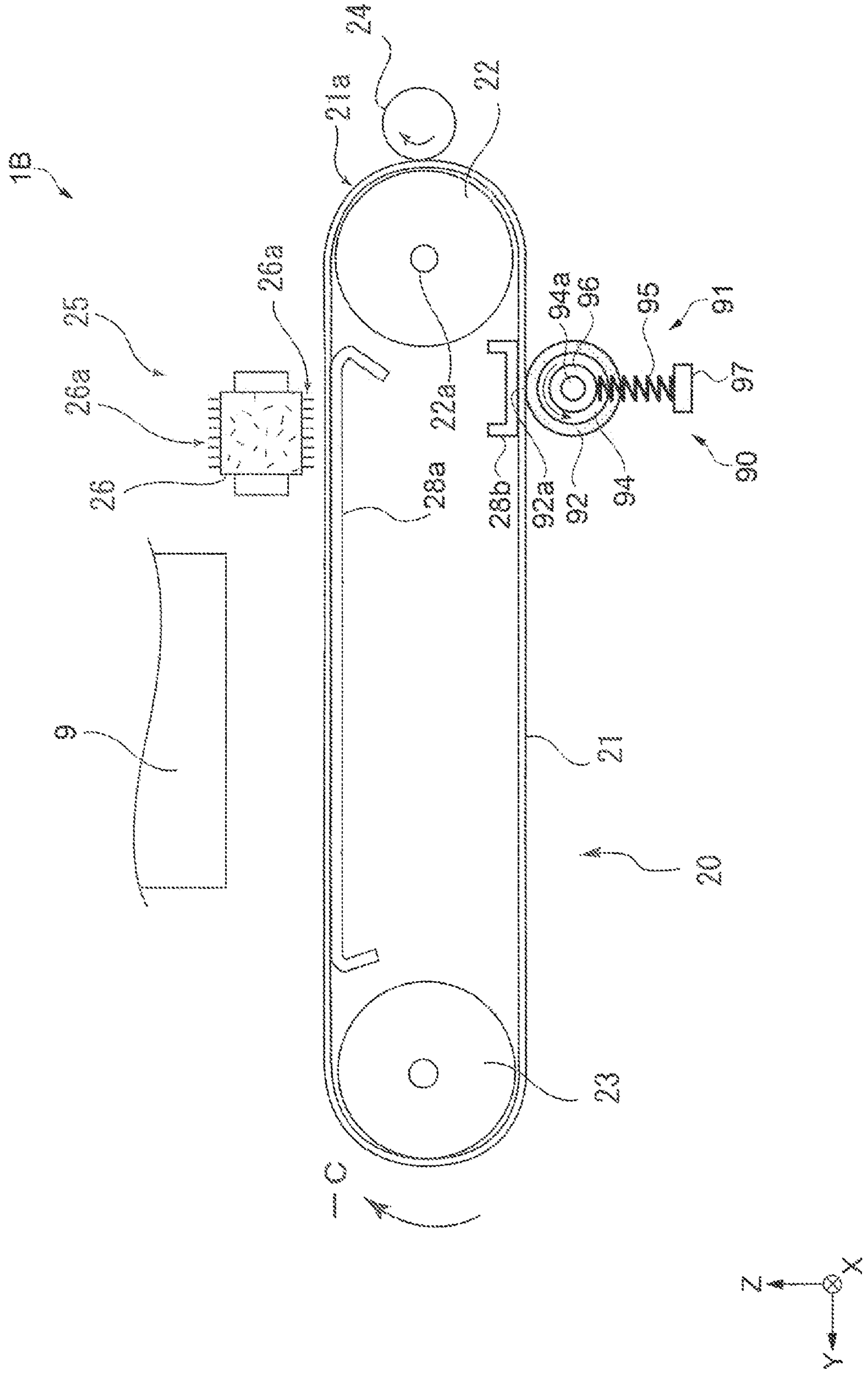
FIG. 5B is a schematic view illustrating a configuration of the recording device according to the third embodiment.

As illustrated in FIG. 5A and FIG. 5B, a recording device 1B of this embodiment includes a cleaning unit 90. The cleaning unit 90 includes a scrape unit 91 that scrapes off the residual at the conveyance belt 21.

The scrape unit 91 includes a roller 94 with a rotation shaft 94*a*, and a sponge member 92 is disposed around the peripheral surface of the roller 94. The sponge member 92 is disposed around the peripheral surface of the roller 94, with equal thickness. The sponge member 92 and the roller 94 are fixed. The sponge member 92 is a melamine sponge.

The cleaning unit 90 includes a pressing part 95 (such as a coil spring) and a fixing member 97 that supports the pressing part 95, and the pressing part 95 pushes the roller 94 toward the conveyance belt 21.

Further, in the recording device 1B of this embodiment, a speed difference is set between the circumferential speed of conveyance belt 21 and the circumferential speed of the roller 94.

More specifically, a one-way clutch 96 is coupled to the rotation shaft 94*a*. The one-way clutch 96 includes a mechanism that does not rotate the roller 94 in one direction around the rotation shaft 94*a*, but rotates the roller 94 in the other direction around the rotation shaft 94*a*.

Then, in this embodiment, the roller 94 does not rotate when the conveyance belt 21 rotates in the conveyance direction of the medium P (circumferentially moves in the +C direction) as illustrated in FIG. 5A. On the other hand, the roller 94 is rotated following the conveyance belt 21 when the conveyance belt 21 rotates in the direction opposite to the conveyance direction of the medium P (circumferentially moves the −C direction) as illustrated in FIG. 5B.

As described above, according to this embodiment, when the conveyance belt 21 rotates counterclockwise, the roller 94 does not rotate due to the one-way clutch 96, and a speed difference is caused between the circumferential speed of the conveyance belt 21 and the circumferential speed of the roller 94. Thus, since the sponge member 92 is fixed and the friction is increased at a contact part 92*a*, the cleaning performance on the conveyance belt 21 can be improved. On the other hand, when the conveyance belt 21 rotates clockwise, the roller 94 rotates following that rotation (rotates counterclockwise). Along with the rotation of the roller 94, the residual adhered to the contact part 92*a* of the sponge member 92 can be dropped from the sponge member 92. In FIG. 5B, the residual is ejected from the contact part 92*a* in the +Y direction, and dropped from the scrape unit 91.

Thereafter, when the conveyance belt 21 rotates counterclockwise again, the roller 94 does not rotate. At this time, a new surface in the sponge member 92 can serve as the contact part 92*a*, and thus the durability (lifetime) of the sponge member 92 can be improved in comparison with the sponge member 92 is brought into contact with the conveyance belt 21 in a fixed manner.

What is claimed is:

1. A recording device comprising:
- a recording unit configured to perform recording by discharging a droplet to a medium;
- a conveyance belt disposed facing the recording unit and convey the medium;
- an electrostatic elimination unit disposed facing the conveyance belt; and
- a cleaning unit including a scrape unit configured to make contact with the conveyance belt and scrape off a residual at the conveyance belt, the electrostatic elimination unit being disposed on an opposite side of the conveyance belt from the cleaning unit, wherein
- the cleaning unit includes a pressing part configured to push the scrape unit against the conveyance belt, and
- the scrape unit includes a contact part that contacts the conveyance belt,
- the contact part being formed of a sponge member, and
- when the residue is scraped off, the contact part is scraped,
- wherein the electrostatic elimination unit overlaps the cleaning unit when viewed in a direction of discharge of the droplet from the recording unit.

2. The recording device according to claim 1, wherein the sponge member is a melamine sponge formed of a melamine resin.

3. The recording device according to claim 1, wherein
- the cleaning unit includes a supporting part configured to support a lower end portion of the sponge member and a fixing member configured to fix the pressing part; and
- one end of the pressing part is coupled to the supporting part, and another end of the pressing part is coupled to the fixing member.

4. The recording device according to claim 1, wherein
- the scrape unit includes a roller including a rotation shaft; and
- the sponge member is disposed at a peripheral surface of the roller.

5. The recording device according to claim 4, wherein a speed difference is set between a circumferential speed of the conveyance belt and a circumferential speed of the roller.

6. The recording device according to claim 5, wherein a torque limiter is coupled to the rotation shaft.

7. The recording device according to claim 5, wherein
- a one-way clutch is coupled to the rotation shaft;
- the roller does not rotate when the conveyance belt rotates in a conveyance direction of the medium; and
- the roller is rotated following the conveyance belt when the conveyance belt rotates in a direction opposite to the conveyance direction.

8. The recording device according to claim 1, comprising a state switching unit configured to switch the conveyance belt between a first state where the conveyance belt faces the recording unit, and a second state where a facing position in the conveyance belt facing the recording unit in the first state is farther from the recording unit than in the first state, wherein
- when the conveyance belt is switched from the first state to the second state, the cleaning unit moves together with the conveyance belt.

9. A recording device comprising:
- a recording unit configured to perform recording by discharging a droplet to a medium;
- a conveyance belt disposed facing the recording unit and convey the medium;
- an electrostatic elimination unit disposed facing the conveyance belt; and
- a cleaning unit including a scrape unit configured to make contact with the conveyance belt and scrape off a residual at the conveyance belt, the electrostatic elimination unit being disposed on an opposite side of the conveyance belt from the cleaning unit, wherein
- the cleaning unit includes a pressing part configured to push the scrape unit against the conveyance belt,
- the scrape unit includes a contact part that contacts the conveyance belt,
- the contact part being formed of a sponge member, and
- when the residue is scraped off, the contact part is scraped,
- a supporting part is configured to support a lower end portion of the sponge member and a fixing member configured to fix the pressing part, the sponge member having a block-like cuboid shape and the supporting part comprising a recess configured to accommodating the lower end portion of the sponge member, and
- one end of the pressing part is coupled to the supporting part, and another end of the pressing part is coupled to the fixing member, the pressing part imparting a constant pressure over an entire longitudinal length of the sponge member.

10. The recording device according to claim 9, wherein the sponge member is a melamine sponge formed of a melamine resin.

11. The recording device according to claim 9, comprising a state switching unit configured to switch the conveyance belt between a first state where the conveyance belt faces the recording unit, and a second state where a facing position in the conveyance belt facing the recording unit in the first state is farther from the recording unit than in the first state, wherein
- when the conveyance belt is switched from the first state to the second state, the cleaning unit moves together with the conveyance belt.

* * * * *